United States Patent

Brooks

[15] 3,638,007

[45] Jan. 25, 1972

[54] DIGITAL CONTROL SIMULATOR

[72] Inventor: Herbert B. Brooks, 600 Washington Ave., Haddonfield, N.J. 08033

[22] Filed: Aug. 5, 1969

[21] Appl. No.: 847,673

[52] U.S. Cl. ..............................235/184, 235/183, 235/197, 320/1, 324/57 B, 328/151, 340/173

[51] Int. Cl. ..........................................................G06g 7/66

[58] Field of Search..................235/184, 183, 152, 156, 164; 333/18, 70; 340/173

[56] References Cited

UNITED STATES PATENTS

| | | | |
|---|---|---|---|
| 3,093,815 | 6/1963 | Karnaugh | 340/173 |
| 3,191,158 | 6/1965 | Sherman | 340/173 |
| 3,292,110 | 12/1966 | Becker et al. | 333/18 |
| 3,314,015 | 4/1967 | Simone | 235/164 X |
| 3,505,512 | 4/1970 | Fricke et al. | 235/184 |

OTHER PUBLICATIONS

Robinson et al., Principles of Digital Filtering Geophysics, Vol. 29, No. 3, June 1964, pp. 395–404

Thomas, Transport Delay-Time Simulation for Transmission Line Representation, IEEE Transactions on Computers, Vol. C–17, No. 3, Mar. 1968, pp. 205–214

*Primary Examiner*—Malcolm A. Morrison
*Assistant Examiner*—Felix D. Gruber
*Attorney*—Wilfred G. Caldwell

[57] ABSTRACT

There is disclosed a simple inexpensive digital controller simulator for processing and modifying an analog input waveform to obtain a desired modification thereof empirically by controlling a set of calibrated potentiometer dials which represent coefficients of a signal equation that correspond to those coefficients used in programming a digital computer for process control to achieve the desired modification. This simulator stores sequential signal samples on capacitors and recalls the stored samples to merge together with the analog waveform modified samples which are controlled in amplitude by the calibrated potentiometers. A delay is simulated in the merged signals by sampling them over a further sequence of time intervals and storing in capacitors for selective access. The delayed signals are then processed in a holding circuit providing a continuous selection of hold between zero and first order. The resulting processed signals then may be used for control of a plant or process from which feedback signals may be derived for merger with the analog input waveform to produce a closed loop control system.

19 Claims, 6 Drawing Figures

Figure 1:
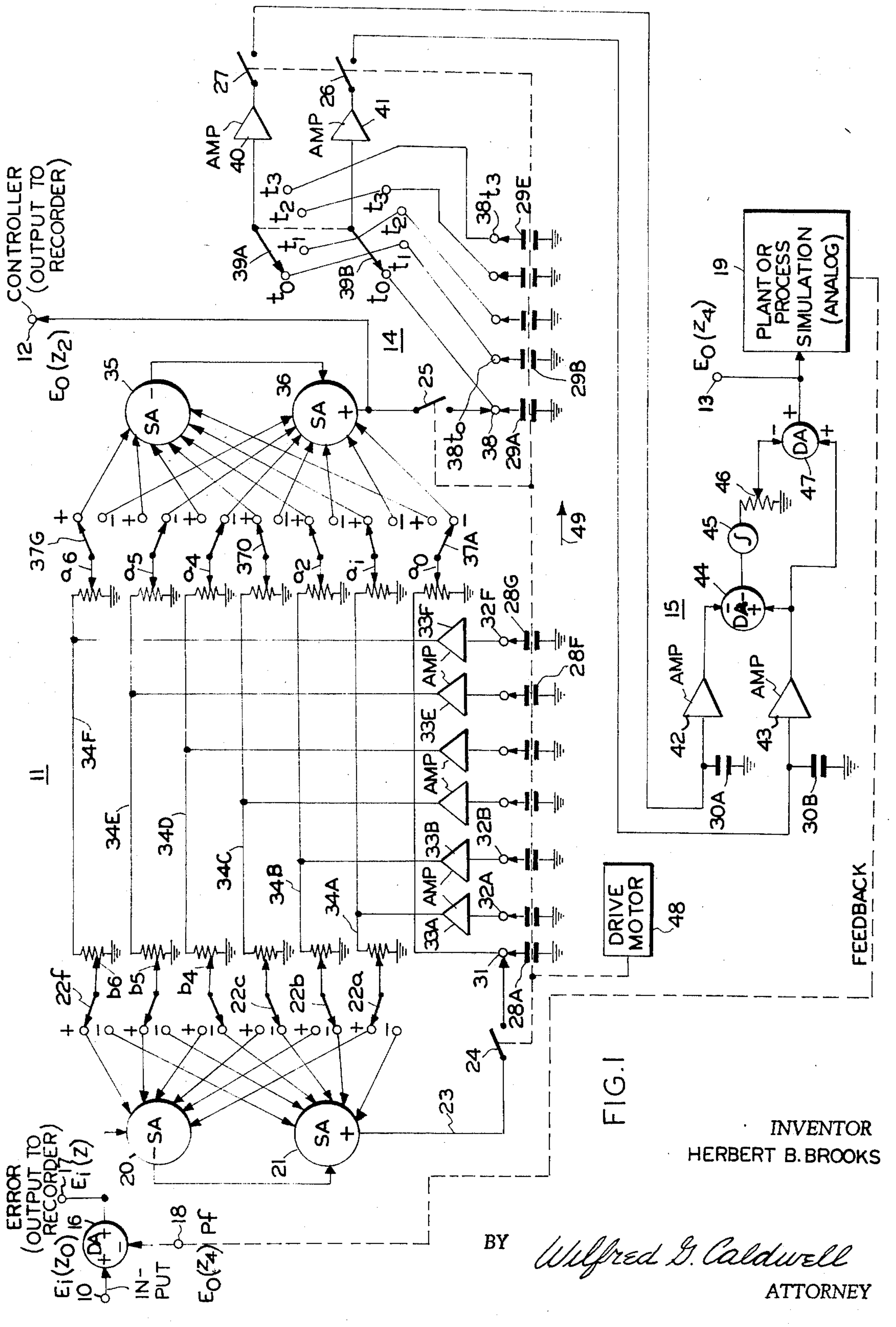

INVENTOR
HERBERT B. BROOKS

BY Wilfred G. Caldwell
ATTORNEY

INVENTOR
HERBERT B. BROOKS

BY *Wilfred G. Caldwell*
ATTORNEY

INVENTOR
HERBERT B. BROOKS

BY *Wilfred G. Caldwell*
ATTORNEY

DIGITAL CONTROL SIMULATOR

This invention relates to apparatus for processing analog signals to obtain modified functions thereof, and more particularly it relates to analog process control apparatus capable of simulating a sampled data digital control arithmetic function programmable on a digital computer.

Digital process control by sampled data methods is well known and digital computers are used for online real-time control of various sorts of plants and processes. The type of programs and the manner of using digital computers in this sort of process in accordance with the state of the art may be typified by published articles such as "Digital Signal Processing," B. J. Thompson and B. J. Goldstone, *Computer Design*, May 1969, pp. 44–59; or those in the book entitled "-Digital and Sampled-data Control Systems," Tou, published by McGraw Hill, 1959.

However, even though the economies of online control may be favorable, digital computer time for experimentation and development of special control programs or process solutions is scarce and expensive, particularly in view of the time taken to run and debug computer programs. Accordingly immediate results are not feasible and furthermore the digital computer program and processing is abstract enough that the personnel involved in the control process may prefer to get a concrete feeling by sensing the effect of different parameters of equation coefficients, time delay, signal feedback, holds, etc.

Accordingly one primary object of the invention is to develop a simple and effective empirically operated digital control simulator that may be used for control purposes and which quickly and conveniently provides direct information in direct form for use in programming digital sampled data control routines.

Digital control devices for generalized use in a plurality of applications should operate in real-time while providing time delay periods and preferably should permit a recorded output record. This permits immediate observation of the output waveform. The time delay function is necessary in control of such industrial processes as control of a steel strip where temperature or thickness is effected at one point and sensed downstream at a later time, or a mixture of chemicals sensed after a period of time, etc.

In such digital control devices signals must be sampled, stored, and read, and various arithmetic operations performed thereon. Thus to simulate sampled data controls for generalized applications a high-cost and complex digital data processing equipment has been required in the prior art.

Accordingly it is another object of the invention to provide simple and low-cost data-processing equipment capable of generalized use in a large variety of sampled data digital control programs.

In order for a simulator to provide a sense of the control process it is desirable to permit manual empirical manipulation of various parameters while observing the changes immediately in the output control waveform. Also it is desirable to produce from the simulator direct dial readings that correspond to parameters of a mathematical model that can be used directly to expedite the programming of a general purpose digital computer for control of a selected process or plant.

Thus, an object of the invention is to provide a sampled digital data control simulator which is empirically manipulated to produce desired control waveform modifications and identify the arithmetic parameters involved in obtaining the observed output waveform pattern.

In performing control functions of a general and versatile nature in the sampled data process, a comprehensive and complex mathematical model must be produced having a multiplicity of variable parameters.

For the simpler pulse transfer functions a pulse transfer characteristic $D_{(z)}=E_o(Z)/E_i(z)=a_o+a_1z^{-1}+$...Thus, the output wave $E_o(z_1)=a_oE_i(z)+a_1z^{-1}E_i(z)+$..., when $a_n$ are magnitude weighting coefficients and $z^{-1}$, etc., represent the delayed sample times.

From this it is clear that the output signal for a simple process can be represented by a transfer characteristic which is the sum of properly weighted input and various delayed input signals.

To be more general the sum should be the algebraic sum permitting the weighting coefficients to be of either minus or plus polarity.

In order to provide more versatile pulse transfer functions an output waveform capability should be available as follows:

$$E_o(z_2)=E_i(z)\,\frac{\sum_{k=0}^{m} a_k z^{-k}}{1+\sum_{k=1}^{n} b_k z^{-k}}$$

Thus the control equipment implementing this transfer function must be capable of summing a plurality of the weighted sampled data pulses and arithmetically processing the results.

To provide for real time delay functions within the process, the following expression can be used: Sampled-Data $E_o(z_3)=E_o(Z_2)_i t+E_o(Z_2)_j(-T)+$...where $t$ is the initial time and $T$ is the delay interposed. Furthermore a hold function is desirable. It may be superimposed upon the time delayed signal to simplify the system equipment in the manner hereinafter explained by permitting the sampled signals to be delayed rather than analog signals although in the physical world the time would be superimposed upon the output of the hold signal. The end result is the same in a linear system. Thus $E_o(z_a{}'=E_o(z_2)-cE_o(z_3)\cdot G_f$ is a desired function where $G_f$ is the transfer characteristic of the hold circuit, generally an integrator such as an R-C time constant circuit. $E_o(z_2)$ represents a zero order hold and $-c$ is a proportional weighting factor for $E_o(z_a{}'G_f$ (the unity order hold) permitting the output signal to be designated at any fractional order hold.

In addition to these other functions a feedback capability is desired wherein:

$E_i(z)=E_i(Z_o)-E_o(z_4)\ P_f$ where the input signal used is obtained by modifying a nominal input signal by its difference with the general control signal developed when operated on by the transformation function $P_f$ of the plant or process being controlled.

It is therefore a further object of the invention to provide a single and effective inexpensive apparatus for performing the foregoing mathematical functions and producing calibrated signals identifying the various coefficients and parameters involved.

Therefore in accordance with this invention the digital control simulator samples analog data from an input varying voltage waveform, and stores the samples in analog voltage form for repeated access at various sampling times. The storage means comprises a set of capacitors, and the memory readout is effectively and simply provided by a sequential rotary switching mechanism. The various coefficients are provided by calibrated potentiometer controls varying the amount of each corresponding signal sample that is summed in operational amplifier circuits. A set of polarity switches provides for selecting the algebraic sense of summation for each signal sample.

A real time delay is inexpensively produced by a further set of capacitors which are sampled synchronously with the sampling intervals to produce delays of an integral number of sampling intervals.

Hold circuits provide for a continuously variable hold order from zero to one.

Figure 2:
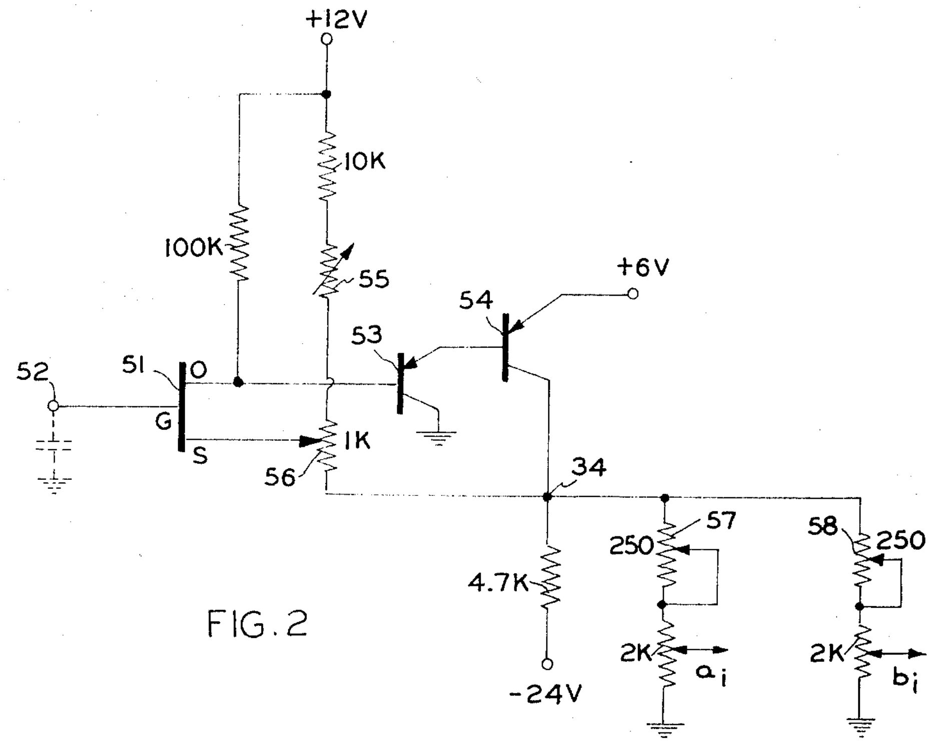
Figure 3:
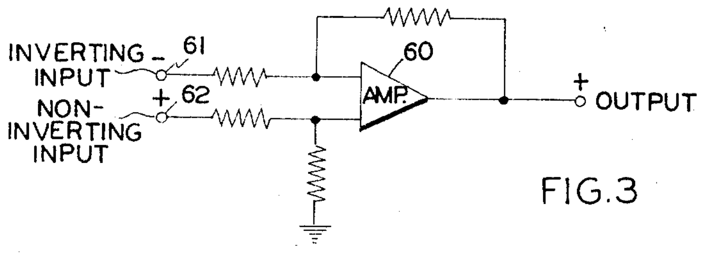
Figure 4:
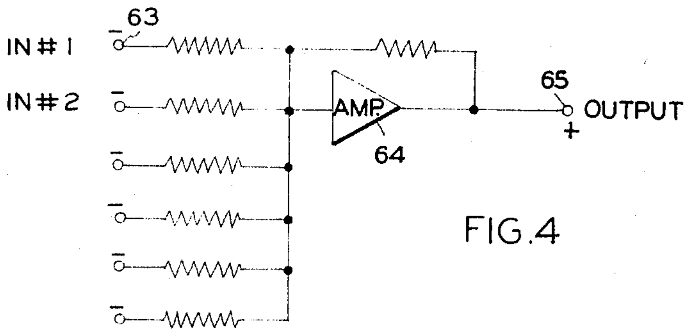
Figure 5:
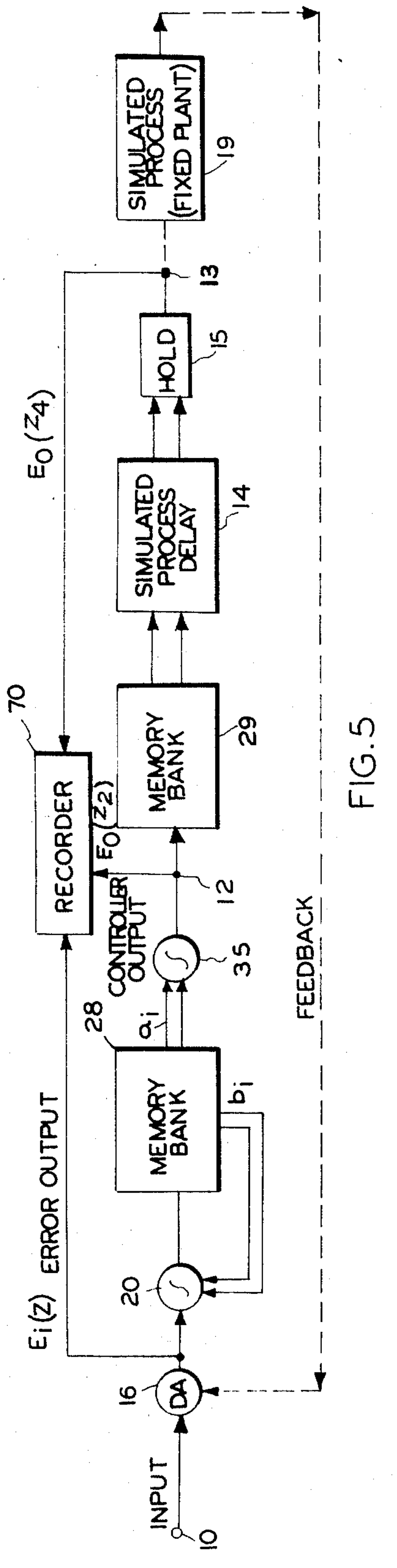
Figure 6:
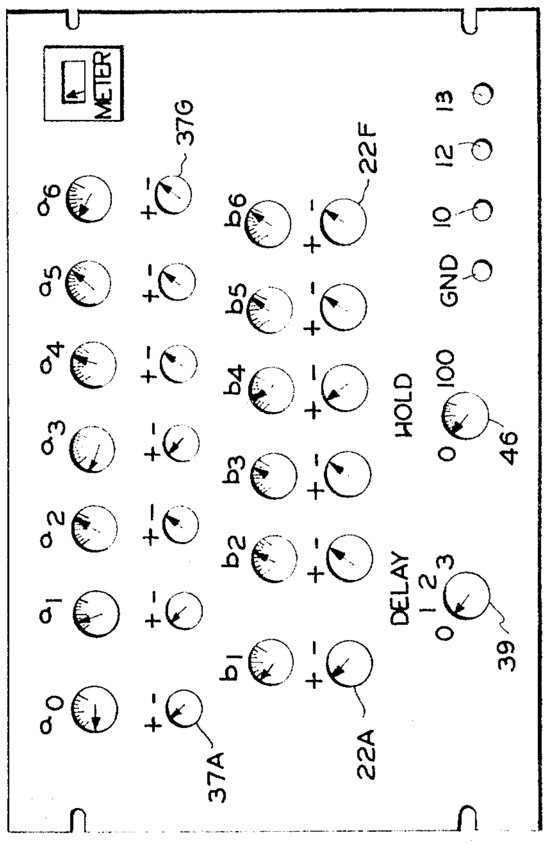

Thus the equipment features low cost, simplicity and versatility while achieving the various aforesaid objectives. Other features, objectives and advantages of the invention will be found throughout the following detailed description of a preferred embodiment of the invention, which is illustrated in the accompanying drawing, wherein FIG. 1 is a schematic block diagram of control simulator apparatus afforded by the invention, FIG. 2 is a schematic circuit disclosure of a readout amplifier used in accordance with the invention to produce multiple access readout of stored analog voltage signals on the capacitors as provided in this invention, FIGS. 3 and 4 are schematic block diagrams of operational amplifiers as employed in accordance with the invention, FIG. 5 is a generalized block diagram of the control simulator afforded by this invention, and FIG. 6 is a plan elevation view of a typical panel layout of the various controls afforded for empirical manipulation of parameters expressed in mathematic models used in the sampled digital data process in accordance with the invention.

With reference now to FIG. 1, input analog voltage signals $E_i(z_{a0})$ of determinable magnitude are presented at terminal 10 for processing in the signal filtering section 11 to produce modified output control signals $E_o(z_2)$ available at terminal 12 for monitoring. Signals $E_o(z_4)$ may also be monitored at terminal 13 after further processing in the delay time memory bank 14 and hold circuit section 15.

The input signals $E_i(z_o)$ may be merged for substraction in differential operational amplifier 16 (FIG. 3) to provide a differential error output signal $E_iz$ at terminal 17, which also may be monitored by a suitable recording device for comparison with the signals at terminals 12 and 13 if desired. The signal fed back along the optional dotted feed back path to terminal 18 is optional since the apparatus may be used for either open or closed loop control or simulation purposes. The signal $E_o(z_4) P_f$ fed back is the ultimate control signal at terminal 13 when operated on in the plant process or simulation controlled section 19 with the transformation function $P_F$ afforded in the controlled section 19.

The input signal $E_i(z)$ is processed through a sequence of two operational summing amplifiers 20, 21 which serve to merge by summing a plurality of data samples in selected positive or negative polarity form as a result of corresponding switches 22*a*, 22*b*, etc. The magnitude coefficient of each data sample is manually and empirically selectable at any of the potentiometers $b_1$, $b_2$, etc., of a set with any magnitude from zero to full amplitude. Each potentiometer is calibrated with a dial (FIG. 6) to show the value of the corresponding coefficient as it would be used to set up a digital computer program in a particular process control mode.

The data samples are taken from the processed signal at lead 23 by means of sampling switch 24. This switch may be operated typically each second, each 5 seconds or each 10 seconds depending upon the waveform to be controlled and the type of recording (manual, meter, recorder) that is contemplated.

Sampling switch 24 is synchronized timewise to operate synchronously with further ganged sampling switches 25, 26 and 27 and as represented by the dotted line through the capacitors the motor drives further switches ganged to sequentially switch each capacitor position to the next adjacent position with each switching sample. These switches may be operated by cams on a timing motor 48 to provide periodic samples as known intervals. The dwell time of the sample is sufficient to properly charge capacitors 28A, 28B, etc., in the first subset at 31, 29A, 29B, etc., in the second subset at 38 and capacitors 30A, 30B in the third subset at 26, 27, from the preceding amplifier circuits.

The timing motor 48, as indicated by the dotted line to capacitor set 28, additionally times the sequential switching mechanism for sequentially presenting each capacitor 28A, 28B, etc., respectively at sampling terminal 31 for each successive sampling time. Capacitors in subset 28A, 28B etc., may then be sequentially placed physically in subset 29A, 29B, for scanning purposes, or alternatively each subset is a separate set of capacitors which are repetitively sequenced in rotation. Capacitor subset 28A, 28B has output terminals 32A, 32B, etc., for sensing the voltage at the respective capacitors which have sampled input data at terminal 31, and have stored thereon a charge representing the voltage magnitude of the input waveform at the instant of the sampling to move into their respective positions. The number of capacitors in the subsets can be varied depending upon the desired precision to which the summation process is carried for subset 28 and the number of orders of delay provided by subset 29.

A special amplifier in each position 33A, 33B, etc., (FIG. 2) is used to repetitively sample the voltage of the capacitors in subset 28 without discharging the capacitors. These amplifiers have unity gain and therefore reproduce at filter network lines 34A, 34B, etc., the respective sampling pulse voltage levels for a plurality of sampling periods. The sampling period voltage is also available at terminal 31 and the corresponding network line. In this embodiment a plurality of seven capacitors provides for a set of seven samples. Six of these samples are fed back into summing amplifiers 20 or 21 by way of potentiometers $b_1$, $b_2$, etc., which produce dependent upon their settings the corresponding variable coefficient portions $b_1$, $b_2$, etc., of the sample voltages that either add to or subtract from the input signal $E_i(z)$.

Similarly a set of potentiometers $a_o$, $a_1$...$a_6$ is provided for independent adjustment of further corresponding coefficients $a_o$, $a_1$, etc., for summation in a similar pair of summing amplifiers 35, 36, selected independently for any one of the sampled signals by corresponding switches 37*a*, 37*b*, etc. This produces at the intermediate output terminal 12 the control signal $e_o(z_2)$ hereinbefore described, which is sampled by switch 25 to appear at terminal 38 and charge capacitor 29A in subset 29.

Since each capacitor 29A, 29B, etc., is sequentially charged at the sampling intervals, this capacitor subset provides the real-time delay of a number of sampling interval periods available for detection at terminals $38_{to}$, $38_{t1}$, etc. This permits manually operable gang switch 39A, 39B to choose the current signal at time $t_o$ or a respective delayed signal $t_1$, $t_2$, or $t_3$.

These signals are processed in holding circuit 15 through capacitor sampling amplifiers 40, 41 (FIG. 2) and are sampled at switches 26 and 27 for storage on capacitors 30A and 30B. Further sampling amplifiers 42, 43 provide unity gain output signals.

Differential amplifier 44 is used to develop a fractional order hold capability in conjunction with the integrator circuit 45, hold potentiometer 46 and differential amplifier 47 to result in the output signal $E_o(z_4)$ hereinbefore defined which by manipulation of the various controls and modifying the filtering effect can produce a waveform of desired characteristic from the input waveform thereby simulating the analog control function necessary for operating the plant or process 19.

The hold circuit 15 serves to smooth out the sampling pulses and requires the previous filter output sampled pulse for comparison with a current pulse for calculation of the first order hold or a fractional order hold in the circuits described. The holding function is described by Kuo, in Chapter 3 of "Analysis and Synthesis of Sampled-Data Control Systems," Prentice Hall, 1963.

In order to obtain high accuracy and good linearity when using storage capacitors, certain precautions must be taken. Thus the capacitors should have low dielectric absorption. "-Mylar," and polystyrene and polycarbonate capacitors are suitable in this respect. Also the capacitors and circuits connected therewith should have very little leakage and if rotary switches are used should preferably include ceramic or other good insulation. Capacitors of 0.1$\mu f$, low voltage rating will suffice. In particular the readout function must be attained without discharging the capacitor. In this respect a DC ampiifier with very low input current (about $10^{-14}$ ampere) is used.

Such an amplifier circuit is shown in FIG. 2 using a MOS Field Effect 3N128 input transistor 51 connected to the capacitor at terminal 52. The circuit parameters and voltages are shown in the drawing. Transistors 53 and 54 are PNP-type 2N5367. A thermistor 55 is provided for temperature stabilization, and potentiometer 56 provides for a zero adjustment.

Output terminal 34 (see FIG. 1) is then referenced to coefficient potentiometers $a_i$ and $b_i$. Trimmer resistors 57 and 58 typically are provided to establish unity gain with the dials of the coefficient potentiometers set at a full scale reading of 1.00, although a gain of 3.00 could be provided if desired in some stages for processing transfer functions as hereinafter described.

The operational amplifiers 60, 64 are conventional as shown in FIGS. 3 and 4. In FIG. 3 the differential amplifier is illustrated with input and output polarities corresponding to the notation of FIG. 1 wherein input voltages may be either inverted or not at respective input terminals 61, 62.

The summing amplifier version is shown in FIG. 4 where the signals at the various input leads 63 are summed and inverted at output terminal 65.

The system may be typified in block diagram form as shown in FIG. 5, where recorder 70 or a corresponding meter is used to display and compare the various waveforms or voltages at pertinent system points. While the preferred memory bank and switching circuits in the embodiment of FIG. 1 have advantages of simplification and low cost other sorts of memory and switching could be employed as signified by memory banks 28 and 29. For example the switches could be of the crossbar stepping switch or matrix switching variety. The entire system of FIG. 5 may be conveniently rack mounted in a panel display somewhat as shown in FIG. 6 where the various controls afforded by the invention for manual empirical manipulation are shown, wherein the reference characters relate to the corresponding structure of FIG. 1 to show the relationship between the plant 19 and the input 10 with the differential and summing amplifiers 16, 20, 35 and recorder output 12 leading to recorder 70. The hold circuits 15 and simulated process delay circuits 14 of FIG. 1 are shown in block form.

The switching of capacitors in subsets 28 and 29 in FIG. 1 can be effected by a 12-pole 12-position rotary switch driven from position to position by motor 48, which comprises a geared-down synchronous clock motor, at specified time intervals by medium of appropriate gearing and stepping devices conventional in the art, or any equivalent variation of switches or switching means such as two different synchronized switch sections. The summing amplifier drivers 21, 36 have low enough output impedances to charge (or discharge) capacitors 28A, 29A to the new level of the respective input waveform during the sampling period. It is important that the sampling contacts 24, 25, 26 and 27 are synchronized and break before the switching of the storage capacitor contacts. This can be accomplished with narrow blades on the same switch or by switches otherwise geared to or cammed with the drive motor.

This system then is capable of stimulating digital process control for either open or closed loop operation, showing response of the system at all times. It will respond to any type of input signal DC or sampled, obtained from the real process, or will respond to idealized or stochastic signals. It solves the convolution summation. It permits the simulation of a mathematical model of a process by empirical selection of coefficients to obtain a satisfactory response, either on line or by use of simulated process conditions.

In a typical operating cycle for solving a problem the mathematical model may be simplified merely by setting unnecessary controls to zero. If a Ragazzini minimal prototype for ramp input is used as an example, the $z$-transform becomes $K(z)=2z^{-1}-z^{-2}$ (Chapter 7, "Sampled Data Control Systems," Ragazzini and Franklin, McGraw Hill, 1958).

This transfer function is realized by sampling the input signal, delaying by one pulse interval and multiplying by +2 and subtracting the input signal delayed by two pulse intervals. Since the denominator in this transfer function is unity no feedback is necessary, so all $b$ potentiometers are set to zero. The $a_1$ coefficient is set corresponding to +2 and the $a_2$ coefficient is set corresponding to −1, with all other ($a$) coefficients set corresponding to zero.

The capacitors can all be cleared by going through a capacitor switching cycle (12 steps) with a zero input signal (input terminal 10 shorted to ground).

The first sampling interval is started with the capacitors located in the positions shown, with capacitor 28A connected to input terminal 31, and it is charged instantaneously (at a sampling period short compared with the sampling interval). For the ramp the initial charge is zero. The output of the filter at terminal 12 is the summation of coefficients $a_1$ and $a_2$ which is zero.

At the second sampling instant, the switching circuits are operated in such a manner that figuratively each capacitor is moved to the right one position as shown by arrow 49, and a different memory capacitor (that now in functional position 29E) is connected to terminal 31. For a unit ramp this would have a value of 1 volt. The output at 12 would still be zero since the voltages at terminal 32A and 32B are still zero.

At the third sampling instant 31 is at 2 volts. Then the capacitor at 32A will have 1 volt and the output at 12 will be +2 volts by way of coefficient $a_i$.

At the fourth sampling instant the filter output at 12 will be +3 volts because of the +2 volts at 32A multiplied at $a_1$ by 2 and the +1 volt at 32B subtracted by the −1 multiplication at $a_2$. Thus voltages developed are 0, 0, +2, +3...as required.

What is claimed is:

1. Versatile and simplified control simulator apparatus for processing a plurality of parameters in mathematic expressions of a sampled digital data process, comprising in combination, input circuit means for developing a variable analog voltage of determinable magnitude at a first terminal, a first and second plurality of capacitors, each capacitor having a common terminal and a free terminal, means coupling, at known time intervals, each of said first plurality of capacitors at said first terminal for receiving and storing on respective capacitors the magnitude of said analog voltage at the sampling interval, means coupling said capacitors with said stored voltage magnitude thereon in sequence at a series of further terminals $a, b...n$, a plurality of detecting means respectively nondestructively sampling and reproducing said voltage magnitude of said capacitors at each of said further terminals $a, b...n$, a first set of potentiometers respectively calibrated in terms of one set of coefficients coupled with one potentiometer receiving from each of said detecting means the stored voltage magnitudes and providing output signals comprising selected portions of the signals stored by said capacitors and reproduced by said detecting means as a definable part of said variable analog voltage selectively determined by the potentiometer setting, circuit means including a second set of potentiometers respectively calibrated in terms of a further set of coefficients similarly coupled to provide an output analog voltage representing selected portions of signals stores on said capacitors and further connected to convey a selected portion of the voltage at said first terminal to an intermediate terminal, means coupling the second plurality of capacitors one at a time at said intermediate terminal in timed synchronism with the coupling of the first-mentioned plurality of capacitors to receive and store the voltage magnitude appearing thereat at the respective sampling intervals on the respective capacitors, and a holding circuit comprising switching means selectively coupled to receive the signals stored upon said further plurality of capacitors in a sequence producing an output analog signal representative of the stored voltage magnitude on a succession of the capacitors.

2. Apparatus as defined in claim 1 including two operational amplifiers coupled to the input circuit means to produce therefrom signals of opposite polarity and switches connecting each potentiometer in said first set selectively to receive signals from either of said amplifiers.

3. Apparatus as defined in claim 1 including two operational amplifiers coupled to produce signals of opposite polarity at said intermediate terminal, and switches connecting each potentiometer in said second set selectively to supply signals to either of said amplifiers for processing therein.

4. Apparatus as defined in claim 1 wherein said holding circuit comprises two switching means respectively coupled to sample different stored voltages on said second plurality of capacitors and each having a further storage capacitor storing these samples, and a holding operational differential amplifier coupled to said further storage capacitors to thereby produce a variable order hold signal at the output of said holding operational amplifier.

5. Apparatus as defined in claim 4 including an integrator circuit and calibrated potentiometer in the output of said holding operational amplifier to produce a fractional order hold signal derivative.

6. Apparatus as defined in claim 5 including operational amplifier means combining said fractional order hold signal derivative with a signal at one of said further storage capacitors in said holding circuit to produce a simulation analog output signal.

7. Apparatus as defined in claim 6 including means processing said simulation analog output signal and feeding back the resulting processed signal to comprise a portion of the voltage at said first terminal.

8. Control simulator apparatus for processing analog voltage signals comprising in combination, a set of capacitors, each capacitor having one terminal in common and a free terminal, means for presenting, in sequence at known time intervals, samples of an analog voltage to a plurality of storage capacitors in said set at a corresponding set of terminals, means coupling a selected subset of said capacitors to receive said analog signals in modified form in a filter simulator circuit comprising a set of manually variable controls defining at least one set of coefficients of a mathematical transfer function by modifying said analog signal voltage magnitudes, means deriving an intermediate voltage which is a function of the stored voltages on said capacitors modified by the setting of said variable controls, means coupling a further subset of said capacitors to receive and store timed samples of said intermediate voltage in a predetermined time sampling sequence synchronously related to said known time intervals, delay selection switching means selectively deriving a sequence of delayed signals stored on capacitors in said further subset, and hold circuit means processing simultaneously the signal derived from two different capacitors by said delay means to derive therefrom an analog output signal.

9. Apparatus as defined in claim 8 including means in said filter simulator circuit for selecting and combining signals of opposed polarities as modified by said set of controls.

10. Apparatus as defined in claim 8 wherein said hold circuit means comprises a series circuit combination of a sampling circuit and a hold storage capacitor.

11. Apparatus as defined in claim 10 wherein said series circuit combination includes an integrating circuit coupled to process the holding circuit signal and a potentiometer control for deriving from the integrating circuit a fractional order hold, to provide at different potentiometer control settings a continuously variable hold from zero order to the first order.

12. Apparatus as defined in claim 8 including a low input current DC amplifier coupled to sense the voltage of each of said plurality of capacitors.

13. Apparatus as defined in claim 12 wherein each said low input current DC amplifier comprises a low leakage field-effect transistor with an input electrode connected directly to its capacitor to sense the voltage thereon, resistive devices connected to the other electrodes of the transistor, a first potential source coupled to the electrodes through said resistive devices, a transistor amplifier connected to one of said electrodes having an output resistor connected with a second potential source higher than the first, and a variable resistive connection between the other one of said electrodes to said output resistor.

14. In a digital controller simulator apparatus, comprising in combination, input circuit means developing an analog input signal as a varying magnitude voltage signal at a first terminal connection, means sampling said signal at a plurality of known sequential time intervals to produce discrete signal samples, means storing said discrete sampled signals for recall, means for selectively modifying said sampled signals as a function of a coefficient of a transfer function operable on said analog signal, means recalling and reproducing selected ones of said sampled signals, combining them with at least a portion of said analog signal and processing these to produce an intermediate signal, means for simulating delay comprising means for sampling and storing said intermediate signal at selected time intervals synchronized with the sampling time of said sampled signals including selection means for selecting different ones of the stored intermediate signals stored at the time intervals to simulate a delay from the sampling times of the corresponding said discrete signal samples.

15. The combination as defined in claim 14 including holding means responsive to said delayed intermediate signals.

16. The combination as defined in claim 14 wherein the means for storing said sampled and intermediate signals comprises a set of storage capacitors for holding an analog voltage signal sample magnitude and switching means for sequentially presenting capacitors in said set for access at a plurality of terminals coupled into said means for modifying and said means for recalling and reproducing the sampled signals.

17. Control apparatus for processing a plurality of parameters in mathematical expressions of a sampled digital data process, comprising in combination, input circuit means developing a variable analog voltage of determinable magnitude at a first terminal, a first plurality of capacitors, each having a common terminal and a free terminal, means presenting, at known time intervals, a sample of said analog voltage to each of said first plurality of capacitors at said terminal for receiving and storing said voltage magnitude samples in said capacitors, means connecting said capacitors in sequence to a series of further terminals *a, b...n*, a plurality of detecting means nondestructively sampling said voltage magnitude of said capacitors simultaneously at each of said further terminals *a, b...n* to reproduce the samples independently, a set of potentiometers respectively calibrated in terms of a set of coefficients with one such potentiometer coupled to each of said detecting means to provide selected portions of the signals on the corresponding ones of said capacitors, means mixing together selected signals from a plurality of potentiometers in said set, a further plurality of capacitors, each having a common terminal and a free terminal, means presenting the mixed together signals to said further plurality of capacitors in timed synchronism with the time intervals of the first-mentioned plurality of capacitors to store in the further plurality of capacitors a series of samples of the magnitude of said mixed together signals, and means selectively taking output signals from predetermined ones of said further plurality of capacitors to represent sampled data delayed by known increments of time.

18. Control apparatus as defined in claim 17 including a holding circuit with an integrator circuit functioning to produce an output analog signal from said last-mentioned output signals.

19. Control apparatus as defined in claim 18 wherein the holding circuit provides a variable-order hold including means processing the sampled data from two of said further plurality of capacitors in a corresponding pair of processing channels, means selectively varying the amplitude of signals in one channel and means summing together processed signals from the two channels.

* * * * *